(12) United States Patent
Miyazaki

(10) Patent No.: US 7,705,077 B2
(45) Date of Patent: Apr. 27, 2010

(54) RUBBER COMPOSITION FOR STEEL CORD AND STEEL CORD COATED THEREBY

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 686 days.

(21) Appl. No.: 11/229,657

(22) Filed: Sep. 20, 2005

(65) Prior Publication Data

US 2006/0089439 A1  Apr. 27, 2006

(30) Foreign Application Priority Data

Oct. 27, 2004  (JP)  ............... 2004-312569

(51) Int. Cl.
*C08K 5/09* (2006.01)

(52) U.S. Cl. ............ 524/394; 428/379; 428/370; 428/381; 428/461; 428/465; 525/346; 524/349; 152/563; 152/564; 152/547; 152/526; 156/124

(58) Field of Classification Search .......... 524/394
See application file for complete search history.

(56) References Cited

U.S. PATENT DOCUMENTS

| | | | | |
|---|---|---|---|---|
| 5,196,464 | A * | 3/1993 | Shinoda et al. | ............ 524/100 |
| 5,688,871 | A | 11/1997 | Inui et al. | |
| 5,861,465 | A * | 1/1999 | Hamada et al. | .......... 525/332.6 |
| 6,096,423 | A * | 8/2000 | Pavan | .......... 428/379 |
| 2001/0039986 | A1 | 11/2001 | Kaneda | |
| 2002/0077423 | A1 | 6/2002 | Sugimoto et al. | |
| 2002/0192489 | A1 * | 12/2002 | Huang et al. | ............ 428/625 |

FOREIGN PATENT DOCUMENTS

| | | |
|---|---|---|
| JP | 7-15029 A | 1/1995 |
| JP | 7-258476 A | 10/1995 |
| JP | 2001-354005 A | 12/2001 |
| JP | 2002-194139 A | 7/2002 |
| JP | 2002-362107 A | 12/2002 |
| JP | 2002362107 A * | 12/2002 |
| JP | 2004-210947 A | 7/2004 |
| JP | 2004-210948 A | 7/2004 |

* cited by examiner

*Primary Examiner*—Marc S Zimmer
*Assistant Examiner*—Noah Frank
(74) *Attorney, Agent, or Firm*—Birch, Stewart, Kolasch & Birch, LLP

(57) ABSTRACT

The present invention provides a rubber composition for coating a steel cord in a belt layer which can decrease a decreasing rate of tensile properties caused by deterioration of thermal oxidation, inhibiting peeling from the steel cord and further reducing a rubber flow, and a steel cord coated with a carcass layer comprising the same. The present invention relates to a rubber composition for coating a steel cord comprising (A) at least 3 parts by weight and less than 5 parts by weight of sulfur, (B) 0.1 to 1 part by weight of hexamethylenebisthiosulfate disodium salt dihydrate, and (C) a cobalt salt of an organic acid containing boron based on 100 parts by weight of a rubber component, wherein the amount of cobalt in the cobalt salt of a boron containing organic acid (C) is 0.05 to 0.25 part by weight based on 100 parts by weight of the rubber component, and a steel cord coated with a carcass layer comprising the same.

9 Claims, No Drawings

RUBBER COMPOSITION FOR STEEL CORD AND STEEL CORD COATED THEREBY

BACKGROUND OF THE INVENTION

The present invention relates to a rubber composition for coating a steel cord and a steel cord coated thereby.

Durability at high pressure and high strain and more adhesiveness with a steel cord have been recently required for a rubber composition for coating a steel cord of a bus or truck tire in accordance with increase of a loading of a bus or truck tire and the JATMA approving air pressure.

As a process of improving adhesiveness with a steel cord, it is known that a cobalt salt, silica, a resin and the like are compounded in a rubber composition for coating a steel cord. However, even if these are compounded, adhesiveness with a steel cord is insufficient and there was a problem that the rubber composition is peeled from the steel cord due to running.

Also, as a process of improving adhesiveness with a steel cord, it is known that a large quantity of sulfur is compounded. However, free sulfur which is not bonded with a rubber or a steel cord is increased in the vulcanized rubber composition, the sulfur lowers tensile properties (strength and elongation at break) of the rubber composition by deterioration caused by heat and oxygen during using the tire, and there has been a problem that cohesive failure in the rubber composition is generated in a durability test.

Japanese Examined Patent Publication No.7-15029 discloses technology by which adhesiveness with a steel cord is improved by using the specified amount of a partial condensate of hexamethylolmelamine pentamethyl ether, a methacresol resin, sulfur and cobalt naphthenate. However, due to using a large amount of cobalt naphthenate, physical properties such as strength at break are lowered and the methacresol resin tends to inhibit a sulfur crosslinking reaction at vulcanization; therefore rubber vulcanization is slow and there was a problem that rubber flow around a steel cord is increased by shaping pressure. Accordingly, it was difficult to homogeneously integrate the steel cord with a rubber.

SUMMARY OF THE INVENTION

An object of the present invention is to provide a rubber composition for coating a steel cord in a belt layer inhibiting lowering of tensile properties and peeling from the steel cord caused by thermally oxidative deterioration, and further reducing rubber flow, and a steel cord coated with a carcass layer comprising thereof.

The present invention relates to a rubber composition for coating a steel cord comprising at least 3 parts by weight and less than 5 parts by weight of (A) sulfur, 0.1 to 1 part by weight of (B) hexamethylenebisthiosulfate disodium salt dihydrate, and (C) a cobalt salt of an organic acid containing boron, based on 100 parts by weight of a rubber component, wherein the amount of cobalt in the cobalt salt of organic acid containing boron (C) is 0.05 to 0.25 part by weight based on 100 parts by weight of the rubber component.

Also, the present invention relates to a steel cord coated with a carcass layer comprising the above described rubber composition for coating a steel cord.

DETAILED DESCRIPTION

The rubber composition for coating a steel cord of the present invention comprises a rubber component, (A) sulfur, (B) hexamethylenebisthiosulfate disodium salt dihydrate (hereinafter, referred to as HTS) and (C) a cobalt salt of an organic acid containing boron (hereinafter, referred to as a cobalt salt of a boron containing organic acid).

The rubber component is not particularly limited, and examples thereof are diene rubbers such as a natural rubber (NR), a styrene-butadiene rubber (SBR) and a butadiene rubber (BR), and butyl rubbers such as a butyl rubber, which are employed in rubber industries. Among those, it is preferable to use NR from the viewpoint that the amount of the cis structure of polyisoprene is nearly 100% and tensile strength is sufficiently superior to other rubber components. The rubber components are used solely or in a combination use of two kinds.

As the sulfur (A), sulfur generally used at vulcanization in rubber industries can be used, but it is preferable to use insoluble sulfur from the viewpoint that it is hardly precipitated on the surface of a rubber, particularly, at extrusion of a rubber sheet or at the storage of the rubber sheet. Herein, the insoluble sulfur refers to polymeric sulfur capable of preventing blooming generated in case of using sulfur as a rubber vulcanizing agent.

The amount of sulfur (A) (in case of the insoluble sulfur, the amount of pure sulfur) is at least 3 parts by weight and preferably at least 4 parts by weight based on 100 parts by weight of the rubber component. When the amount is less than 3 parts by weight, sulfur is not sufficiently provided to a plated layer of the steel cord and peeling strength is inferior. Also, the amount of sulfur (A) is less than 5 parts by weight and preferably at most 4.9 parts by weight. When the amount is at least 5 parts by weight, free sulfur which is not bonded with a rubber or steel is increased in a vulcanized rubber composition, tensile properties of the rubber composition are lowered and deterioration caused by thermal oxidation occurs easily.

The rubber composition for coating a steel cord of the present invention improves tensile properties and tensile properties after deterioration by thermal oxidation, by compounding a small amount of sulfur (A) and the cobalt salt of an boron containing organic acid (C). However, hardness of a rubber composition and adhesiveness with a steel cord are lowered by being a small amount of sulfur (A) and the cobalt salt of an boron containing organic acid (C). In the present invention, adhesiveness is improved by further compounding HTS (B).

HTS (B) generates a bond of $\{-S_x-(S-(CH_2)_6-S)-S_y-\}$ in a process of generating and dissociating a poly S bond of sulfur to stabilize thermally. A reason for stabilization is that the dissociation energy between sulfurs of $\{-S_x-S_y-\}$ is smaller than that of $S_x$-S, S—$CH_2$ and S-$S_y$. This thermal stabilization accompanies improvement in tensile strength after thermal aging.

Also, when a steel cord and sulfur form a bond by an adhesion reaction, HTS provides appropriate $H_2O$ delivering a water containing component thereof and has effects of promoting an adhesion reaction.

The amount of HTS (B) is at least 0.1 part by weight based on 100 parts by weight of the rubber component, preferably at least 0.2 part by weight and more preferably at least 0.3 part by weight. When the amount is less than 0.1 part by weight, adhesiveness with a steel cord and tensile properties are not revealed sufficiently. Also, the amount of HTS (B) is at most 1 part by weight, preferably at most 0.8 part by weight and more preferably at most 0.7 part by weight. When the amount exceeds 1 part by weight, hardness of a rubber is increased; therefore elongation is lowered and the lowering of tensile properties caused by deterioration by thermal oxidation is increased.

The cobalt salt of an organic acid which contains boron (the cobalt salt of a boron containing organic acid) (C) refers to a cobalt salt of an aliphatic acid containing boron. The cobalt salt of a boron containing organic acid (C) plays a role of crosslinking the cord with the rubber and can improve adhesiveness of the cord with the rubber by transferring on the surface of the cord during vulcanization to repair lattice defects of brass plating even if only a small amount is compounded. The cobalt salt of a boron containing organic acid (C) is excellent from the viewpoint that it can further inhibit peeling of a rubber composition from a steel cord generating at deterioration by moisture and heat and at tire-running, compared with a cobalt salt of an organic acid generally used such as cobalt stearate and cobalt naphthenate.

The amount of the cobalt salt of a boron containing organic acid (C) is at least 0.05 part by weight converted to cobalt based on 100 parts by weight of the rubber component and preferably at least 0.08 part by weight. When the amount is less than 0.05 part by weight, a concentration of cobalt in brass plating is lowered and an ability of repairing lattice defects is insufficient. Also, the amount is at most 0.25 part by weight and preferably at most 0.20 part by weight. When the amount exceeds 0.25 part by weight, deterioration of a rubber is promoted, strength at break after aging is lowered and, further, it costs high.

The rubber composition for coating a steel cord of the present invention preferably does not contain the adhesive resins such as the partial condensate of hexamethoxymethylolmelamine pentamethyl ether (HMMPME) and the modified resorcin condensate. The curing of a rubber at initial vulcanization is delayed and rubber flow is increased by containing the adhesive resin.

The rubber composition for coating a steel cord of the present invention can suitably compound a reinforcing agent such as carbon black and silica, zinc oxide, an antioxidant, a vulcanization accelerator and the like in addition to the above-described rubber component, sulfur (A), HTS (B) and the cobalt salt of a boron containing organic acid (C).

In case of compounding carbon black as a reinforcing agent, the amount of carbon black is preferably 50 to 75 parts by weight based on 100 parts by weight of the rubber component. When the amount is less than 50 parts by weight, hardness of the obtained rubber composition tends to be lowered. Also, when it exceeds 75 parts by weight, viscosity during a rubber processing becomes high and exothermic heat tends to become large.

As the antioxidant, a phenylene diamine antioxidant is preferably used.

The amount of the antioxidant is preferably 0.5 to 2 parts by weight based on 100 parts by weight of the rubber component. When the amount is less than 0.5 part by weight, effects of preventing oxidation and effects of preventing aging of a polymer tends to be little. Also, when it exceeds 2 parts by weight, adhesiveness of the steel cord with a coated layer tends to be inhibited.

A pneumatic tire (such as a radical tire) can be prepared by coating the steel cord with the rubber composition for coating a steel cord of the present invention to form a coated layer of the steel cord, laminating other parts of the tire to mold an unvulcanized tire and vulcanizing the unvulcanized tire.

Examples of the coated layer of the steel cord are a breaker layer and a carcass layer. Among those, it is particularly preferable to use the rubber composition for coating a steel cord of the present invention in a carcass layer for the reason that the rubber is cured faster at shaping the cover when vulcanizing and the rubber and the steel cord are unified with homogeneous gauge.

The rubber composition for coating a steel cord of the present invention is preferably used for the steel cord in which the carcass is hardly elongated and bad rubber flow occurs easily, namely, it is preferably used for a heavy load tire of a bus and a truck among tires.

EXAMPLES

The present invention is explained in detail in Examples, but is not limited thereto.
Natural rubber: RSS#3
Carbon black: LH (N326) available from Mitsubishi Chemical Corporation
Zinc oxide: GINREI R available from Toho Zinc Co., Ltd.
Antioxidant: NOCRAC 6C available from OUCHISHINKO CHEMICAL INDUSTRIAL CO., LTD.
Vulcanization accelerator: NOCRAC DZ-G available from OUCHISHINKO CHEMICAL INDUSTRIAL CO., LTD.
Stearic acid: Stearic acid available from NOF Corporation
Insoluble sulfur: CRYSTEX OT20 (20% oil treatment; a pure sulfur in the amount of 80% by weight) available from FLEXSYS Co.
Cobalt salt (cobalt boron 3 neodecanoate): Dicnate NBC-II (the amount of cobalt: 22.5% by weight) available from Dainippon Ink And Chemicals Incorporated.
HTS (hexamethylenebisthiosulfate disodium salt dihydrate): DURALINK
HTS available from FLEXSYS Co.
Adhesive resin 1: SUMIKANOL 620 available from Taoka Chemical Co., Ltd.
Adhesive resin 2: SUMIKANOL 507A available from Taoka Chemical Co., Ltd.

Various chemicals other than insoluble sulfur, the vulcanization accelerator and resin for adhesion 2 among the composition content shown in Table 1 were kneaded with a Banbury mixer. Insoluble sulfur, the vulcanization accelerator and resin for adhesion 2 were added to the obtained kneaded compound and the mixture was kneaded with an open roll to obtain an unvulcanized rubber composition. Test pieces were prepared by vulcanizing the an unvulcanized rubber composition at 150° C. for 30 minutes.

<Curelasto>

A curing test was carried out at a measurement temperature of 160° C. using an oscillating type vulcanization tester (Curelastometer) described in JIS K 6300 and a vulcanization speed curve, wherein time and torque were plotted, was obtained. When regarding the minimum value of the curing speed curve as ML, the maximum value as MH and the difference (MH−ML) as ME, a time $T_{10}$ (min.) for reaching at ML+0.1 ME was read. 1.3 to 1.7 minutes is good. When it is more than 1.7 minutes, rubber flow is great, and when less than 1.3 minutes, rubber scorch occurs easily, which is not preferable.

<Hardness>

Hardness of prepared test pieces was measured by using a JIS-A hardness testing machine.

<Tensile Test (Strength and Elongation at Break)>

The tensile test was carried out by using a No. 3 dumbbell test piece in accordance with JIS K6251 and strength (MPa) and elongation (%) at break of test pieces were respectively measured. Also, strength and elongation at break of test peaces after deterioration by thermal oxidation under conditions of a temperature of 80° C. for 4 days were respectively measured in the same manner.

The evaluation results of curelasto, hardness, strength and elongation at break are respectively shown in Table 1.

A pneumatic tire was prepared by vulcanizing an unvulcanized tire molded by laminating other parts of a tire, after a carcass layer was formed by coating a steel cord with the unvulcanized rubber composition, and tests shown below were conducted.

<Adhesion Test (Peeling Strength)>

A sample for peeling was cut out from the tire, and peeling strength was measured by measuring tensile strength with an instron. The measured value of Example 3 is regarded as 100 based on measured peeling strength and respectively indicated by index. Also, peeling strength was measured in the same manner with respect to the rubber composition after deterioration by moisture and heat under conditions of a temperature of 80° C. and a humidity of 95% for 150 days.

<Drum Test of Reproducing Separation Resistance>

After the tire was put in an oven and deteriorated at 80° C. for 3 weeks, a running distance was measured until the swelling of a tread portion and the like were abnormally generated when drum running of the tire was conducted under the condition of overloading at 140% based on the maximum loading (the maximum air pressure condition) of the JIS standard. The measured value was indicated by an index, regarding the measured value of Example 3 as 100. The larger the figure is, the more excellent durability of a tread is.

The evaluation results of peeling strength and the drum test of reproducing separation resistance are respectively shown in Table 1.

TABLE 1

|  | Ex. 1 | Ex. 2 | Ex. 3 | Ex. 4 | Ex. 5 | Ex. 6 |
|---|---|---|---|---|---|---|
| Composition (part by weight) | | | | | | |
| Natural rubber | 100 | 100 | 100 | 100 | 100 | 100 |
| Carbon black | 60 | 60 | 60 | 60 | 60 | 60 |
| Zinc oxide | 9.5 | 9.5 | 9.5 | 9.5 | 9.5 | 9.5 |
| Antioxidant | 1 | 1 | 1 | 1 | 1 | 1 |
| Vulcanization accelerator | 0.7 | 0.7 | 0.7 | 0.7 | 0.7 | 0.7 |
| Stearic acid | 1 | 1 | 1 | 1 | 1 | 1 |
| Insoluble sulfur | 5.63 | 5.63 | 6.13 | 6.13 | 6.13 | 6.13 |
| (amounts of pure sulfur) | 4.5 | 4.5 | 4.9 | 4.9 | 4.9 | 4.9 |
| Cobalt salt | 0.444 | 0.888 | 0.444 | 0.888 | 0.444 | 0.888 |
| (amounts of cobalt) | 0.10 | 0.20 | 0.10 | 0.20 | 0.10 | 0.20 |
| HTS | 0.25 | 0.25 | 0.25 | 0.25 | 0.50 | 0.50 |
| Adhesive resin 1 | — | — | — | — | — | — |
| Adhesive resin 2 | — | — | — | — | — | — |
| Evaluation results | | | | | | |
| Curelasto $T_{10}$ (min.) | 1.5 | 1.4 | 1.6 | 1.5 | 1.6 | 1.5 |
| Hardness (JIS Hs) | 68 | 68 | 71 | 71 | 72 | 72 |
| Strength at break (MPa) | 25 | 25 | 26 | 26 | 27 | 27 |
| After deterioration by thermal oxidation | 21 | 21 | 21 | 20 | 21 | 20 |
| Elongation at break (%) | 450 | 450 | 420 | 420 | 410 | 400 |
| After deterioration by thermal oxidation | 350 | 320 | 320 | 310 | 280 | 270 |
| Peeling strength | 95 | 95 | 100 | 100 | 100 | 100 |
| After deterioration by moisture and heat | 85 | 90 | 90 | 90 | 90 | 95 |
| Drum test of reproducing separation resistance | 90 | 95 | 100 | 85 | 75 | 70 |

|  | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
|---|---|---|---|---|---|---|---|---|
| Composition (part by weight) | | | | | | | | |
| Natural rubber | 100 | 100 | 100 | 100 | 100 | 100 | 100 | 100 |
| Carbon black | 60 | 60 | 60 | 60 | 60 | 60 | 60 | 60 |
| Zinc oxide | 9.5 | 9.5 | 9.5 | 9.5 | 9.5 | 9.5 | 9.5 | 9.5 |
| Antioxidant | 1 | 1 | 1 | 1 | 1 | 1 | 1 | 1 |
| Vulcanization accelerator | 0.7 | 0.7 | 0.7 | 0.7 | 0.7 | 0.7 | 0.7 | 0.7 |
| Stearic acid | 1 | 1 | 1 | 1 | 1 | 1 | 1 | 1 |
| Insoluble sulfur | 5.63 | 6.13 | 5.63 | 6.13 | 3.63 | 7.5 | 6.13 | 6.13 |
| (amounts of pure sulfur) | 4.5 | 4.9 | 4.5 | 4.9 | 2.9 | 6.0 | 4.9 | 4.9 |
| Cobalt salt | 0.444 | 0.888 | 0.444 | 0.888 | 0.444 | 0.444 | 0.444 | 0.444 |
| (amounts of cobalt) | 0.10 | 0.20 | 0.10 | 0.20 | 0.10 | 0.10 | 0.10 | 0.10 |
| HTS | — | — | — | — | 0.25 | 0.25 | 0.05 | 1.5 |
| Adhesive Resin 1 | — | — | 1.0 | 1.0 | — | — | — | — |
| Adhesive resin 2 | — | — | 1.5 | 1.5 | — | — | — | — |
| Evaluation results | | | | | | | | |
| Curelasto $T_{10}$ (min.) | 1.5 | 1.4 | 2.3 | 2.4 | 1.6 | 1.6 | 1.6 | 1.8 |
| Hardness (JIS Hs) | 67 | 70 | 69 | 73 | 60 | 77 | 69 | 74 |
| Strength at break (MPa) | 25 | 25 | 26 | 29 | 19 | 29 | 26 | 28 |
| After deterioration by thermal oxidation | 21 | 21 | 22 | 23 | 17 | 15 | 20 | 20 |
| Elongation at break (%) | 450 | 430 | 400 | 380 | 500 | 380 | 400 | 380 |

TABLE 1-continued

| | | | | | | | | |
|---|---|---|---|---|---|---|---|---|
| After deterioration by thermal oxidation | 350 | 310 | 250 | 230 | 440 | 200 | 250 | 210 |
| Peeling strength | 80 | 90 | 95 | 100 | 60 | 100 | 80 | 110 |
| After deterioration by moisture and heat | 50 | 80 | 60 | 90 | 40 | 95 | 50 | 90 |
| Drum test of reproducing separation resistance | 40 | 70 | 60 | 40 | 50 | 90 | 80 | 70 |

The present invention can provide a rubber composition for coating a steel cord inhibiting the lowering of tensile properties caused by thermally oxidative deterioration and peeling from the steel cord and further reducing rubber flow by containing specified amounts of (A) sulfur, (B) hexamethlenebisthiosulfate disodium salt dihydrate and (C) a cobalt salt of an organic acid containing boron, and a steel cord coated thereby.

What is claimed is:

1. A rubber composition for coating a steel cord comprising:
   (A) at least 3 parts by weight and less than 5 parts by weight of sulfur,
   (B) 0.1 to 1 part by weight of hexamethylenebisthiosulfate disodium salt dihydrate, and
   (C) a cobalt salt of an organic acid containing boron, based on 100 parts by weight of a rubber component, wherein the amount of cobalt in the cobalt salt of an organic acid containing boron
   (C) is 0.05 to 0.25 part by weight based on 100 parts by weight of the rubber component.

2. A carcass layer having a steel cord coated with the rubber composition for coating a steel cord of claim 1.

3. The carcass layer of claim 2, wherein the sulfur (A) is present in an amount of at least 4.5 parts by weight and less than 4.9 parts by weight; the hexamethylenebisthiosulfate disodium salt dihydrate (B) is present in an amount of 0.3 to 0.7 parts by weight; and the amount of cobalt in the cobalt salt of an organic acid containing boron (C) is 0.08 to 0.10 parts by weight, based on 100 parts by weight of the rubber component.

4. The carcass layer of claim 2, wherein the rubber composition does not contain an adhesive resin.

5. The rubber composition of claim 1, wherein the sulfur (A) is present in an amount of at least 4.5 parts by weight and less than 4.9 parts by weight; the hexamethylenebisthiosulfate disodium salt dihydrate (B) is present in an amount of 0.3 to 07parts by weight; and the amount of cobalt in the cobalt salt of an organic acid containing boron (C) is 0.08 to 0.10 parts by weight, based on 100 parts by weight of the rubber component.

6. The rubber composition of claim 1, wherein the composition does not contain an adhesive resin.

7. A tire having a carcass layer comprising a steel cord coated with a rubber composition comprising:
   (A) at least 3 parts by weight and less than 5 parts by weight of sulfur,
   (B) 0.1 to 1 part by weight of hexamethylenebisthiosulfate disodium salt dihydrate, and
   (C) a cobalt salt of an organic acid containing boron, based on 100 parts by weight of a rubber component,
   wherein the amount of cobalt in the cobalt salt of an organic acid containing boron (C) is 0.05 to 0.25 parts by weight based on 100 parts by weight of the rubber component.

8. The tire of claim 7, wherein the sulfur (A) is present in an amount of at least 4.5 parts by weight and less than 4.9 parts by weight; the hexamethylenebisthiosulfate disodium salt dihydrate (B) is present in an amount of 0.3 to 0.7 parts by weight; and the amount of cobalt in the cobalt salt of an organic acid containing boron (C) is 0.08 to 0.10 parts by weight, based on 100 parts by weight of the rubber component.

9. The tire claim 7, wherein the rubber composition does not contain an adhesive resin.

* * * * *